Jan. 15, 1957
G. FAUSER
2,777,877
PROCESS FOR THE PRODUCTION OF UREA
Filed March 6, 1953
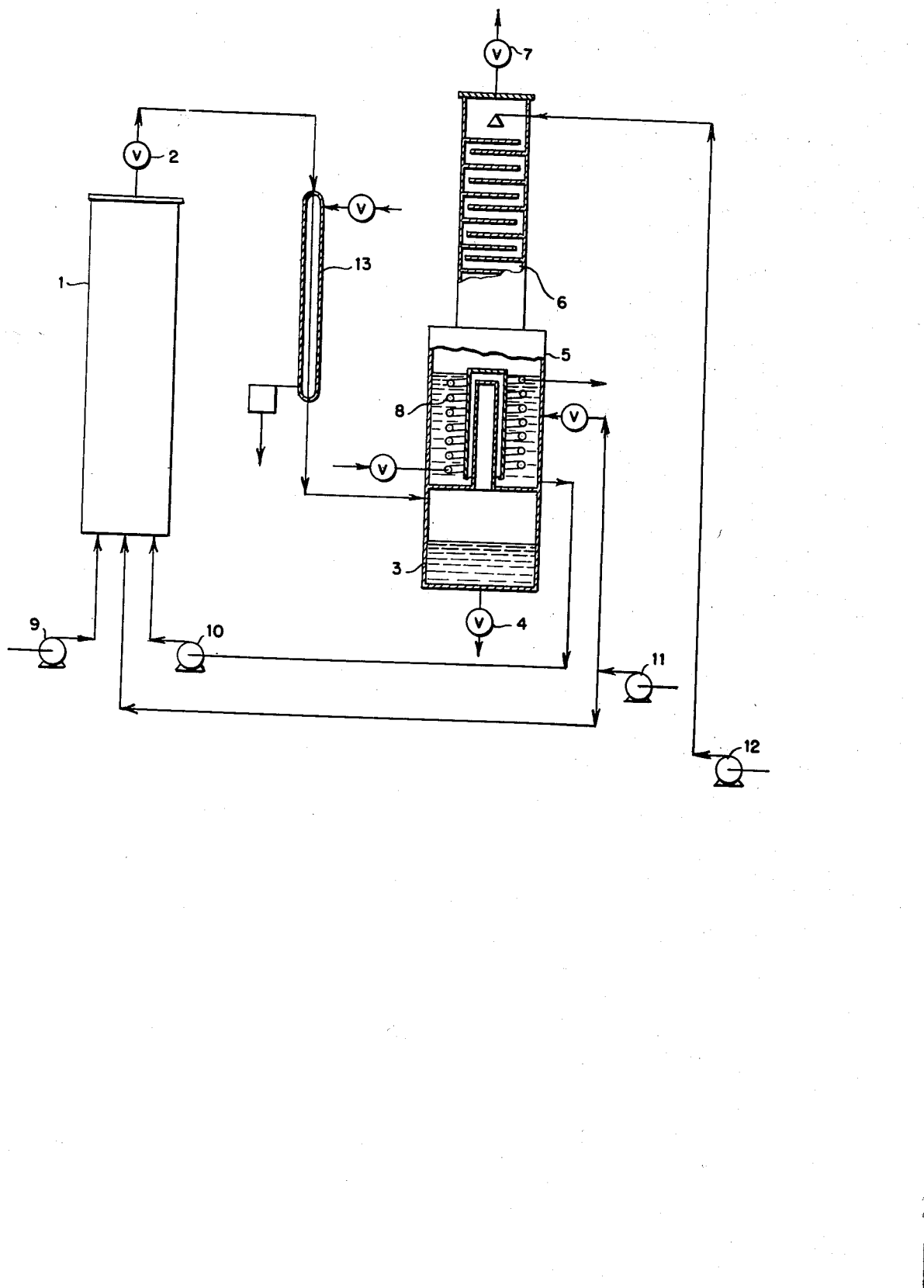

United States Patent Office 2,777,877
Patented Jan. 15, 1957

2,777,877
PROCESS FOR THE PRODUCTION OF UREA

Giacomo Fauser, Milan, Italy, assignor to Montecatini, Società Generale per l'Industria Mineraria e Chimica, a corporation of Italy Application March 6, 1953, Serial No. 340,780

Claims priority, application Italy March 11, 1952

1 Claim. (Cl. 260—555)

This invention relates to the synthesis of urea from carbon dioxide and ammonia.

It is known that the reaction between carbon dioxide and ammonia is not quantitative and if the concentration of urea has attained a determined value, which depends on pressure and temperature, the reaction stops.

The operation is carried out by compressing separately ammonia and carbon dioxide in an autoclave kept at a temperature higher than 150° and at the pressure of about 160 atm. or more, however, only about 40% of the two reagents is converted into urea and the balance remains in the form of carbamate.

Most commonly one recovers the starting materials that have not reacted by distilling them off from the urea synthesis melt discharged from the autoclave and by absorbing the gaseous ammonia in sulfuric acid, forming ammonium sulfate, while the gaseous carbon dioxide is recompressed into the urea autoclave. This process does not offer any difficulties of embodiment, but limits very much the possibility of urea production for a determined plant. As a matter of fact, the recovery of residual gases, corresponding to the production of 10 tons of urea, requires the contemporaneous production of about 35 tons of ammonium sulfate.

Numerous processes have already been proposed to transform into urea also the gases that have not reacted in the autoclave.

Recompression of the carbamate in the gaseous state ($2NH_3+CO_2$) offers considerable technical difficulties, it being necessary to keep the cylinders of the compressor and the respective ducts at a sufficiently elevated temperature to prevent salt condensation. The mixture of ammonia and carbon dioxide is extremely corrosive at elevated temperatures, and, therefore, the upkeep of the compressors destined to recompress the carbamate into the autoclave is exceedingly burdensome; moreover, this method requires relevant consumption of energy.

The attempt had been made to overcome the aforesaid inconveniences by effecting the condensation of the carbamate in the form of a slurry composed of solid particles in suspension in an inert liquid or in liquid ammonia, and to introduce the slurry thus obtained into the autoclave by means of a suitable pump. However, also the embodiment of these processes offers more than normal difficulties in plant operation, caused by scale formation of the salt on the walls of the coolers, or because it is not easy to ensure regular operation of the pumps which have to compress to 200 atm. a liquid containing solid particles in suspension, etc.

The present invention eliminates the aforesaid difficulties; it comprises effecting the condensation of the carbamate at a sufficiently elevated temperature to obtain the $NH_3$—$CO_2$ salts only in liquid phase which may be easily pumped again into the autoclave for urea synthesis. The melting temperature of pure carbamate is 153° C., but in the presence of an excess of ammonia the melting temperature is reduced to 110° C., linked to a pressure of about 70 atm.

In practice this pressure is even lower owing to the presence of a small quantity of water which distils together with the carbamate from the urea synthesis melt. It has been found indeed that if the aforesaid mixture contains 3% of water, the crystallizing temperature of the salt is reduced to 90°, with a corresponding pressure of about 45 atm. Increasing the percentage of water to 10%, the temperature is reduced to 80° and the corresponding pressure to 30 atm. While the formation of carbamate in the solid state is very slow and requires large heat exchange surfaces to eliminate the latent heat, the condensation of carbamate in the liquid state is instead greatly facilitated by the increase of pressure and can be performed with apparatuses of considerably reduced size.

Operating according to this invention, the condensation of the gaseous components of the carbamate in an excess of liquid $NH_3$ and some water by moderate indirect cooling, without practically increasing or decreasing the pressure, one obtains the following advantageous results:

(1) While the condensation temperature is kept ranging from 60° to 90° C., the autogenous pressure is reduced to a reasonable figure (20 to 45 atm.);

(2) Easy condensation by means of a small condenser since at the operating temperature latent condensation heat is small;

(3) Operating temperature is high enough to prevent scale deposits on the walls or formation of solid carbamate suspended in the liquid phase or clogging of valves or pumps or pipelines causing shut-downs, erosion and other troubles;

(4) The operating field between allowable higher temperatures and lower pressures (at which vaporization troubles start) and allowable lower temperatures and corresponding higher pressures (at which also solid carbamate is likely to be condensed) has thus been enlarged granting the necessary premise for a smooth and effective run of the whole recycle in the urea synthesis;

(5) No necessity of installing a gas compressor and overall saving of power consumption;

(6) Saving of calories by reheating the liquid carbamate condensed at a rather high temperature, before feeding it into the autoclave.

The main hindrance to effecting the condensation of carbamate at a pressure of 45 atm. consists in that the decomposition of the carbamate for separating it from the urea synthesis melt, has to take place at elevated temperature and, therefore, with partial decomposition of urea and consequent lowering of the yield of the operation.

It has been found however that the decomposition or degradation of urea may be reduced to negligible values if pressure distillation is effected in a very short time, and this may be attained in a very simple way by subjecting the urea synthesis melt to rapid and effective heating. The pressure drop between the autoclave and the condenser enables to impart to the liquid a very high speed in the heat exchanger increasing the rate of heat transfer and hence effecting distillation by means of an apparatus of modest size.

According to the invention, the solution issuing from the urea autoclave (synthesis reactor), to which the reactants $CO_2$ and $NH_3$ are fed with an excess of $NH_3$ and with an amount of water which may be limited in practice to less than 12% (so as to have less than 20% of water in the autoclave), and in which the reaction is carried out, is subjected to rapid distillation at a pressure sufficient to permit condensation of the distilled carbamate to the liquid state (there is no need of any compression), in order that it may be possible to pump the carbamate back into the autoclave without danger of formation of solid NH₃—CO₂ compounds.

Said distillation should be carried out at a pressure in the range of from 20 to 45 atm. and at from about 130° to about 140° C. Subsequently the carbamate is condensed to the liquid state, contacting it with liquid ammonia and water, acting as condensing agents, and with the aid of indirect moderate cooling.

The liquid ammonia which may conveniently be introduced in this state of the process, in excess over the free ammonia coming (together with the carbamate ammonia) from the urea synthesis melt, is successively to be fed to the synthesis autoclave together with the condensed liquid. This amount of ammonia therefore represents all or parts of the make up liquid ammonia for the urea synthesis.

It is also an object of this invention to provide a process in which ammonia and carbon dioxide, containing substantial quantities of inert gases, may be used in a urea synthesis system. The inert gases, after leaving the carbamate condenser, are effectively removed (purged) in this particular step of the process after having been washed with water in order to recover their ammonia and carbon dioxide content (free or combined).

The water used as a condensing agent as mentioned above is the wash water from the stripping of said inert gases and should be the minimum amount required to recover carbamate contained therein.

The condensation of the carbamate is effected without any compression, that is at a pressure of from 20 to 45 atm., and at temperature of from 70° to 85° C.; under these conditions, a liquid condensate is obtained which is completely free from any solid particles of carbamate and which may have practically a water content lower than 25%, preferably lower than 12%. The condensate is recycled under pressure and heating to the urea autoclave.

One embodiment of the invention is represented by way of example without limitation in the accompanying drawing. The urea synthesis melt issuing from the autoclave 1 is discharged by means of the valve 2 at a pressure between 45 atm. and 20 atm. into the heat exchanger or pressure distiller 13. The heating of this apparatus is conveniently adjusted so as to obtain rapid vaporization of the most part of the carbon dioxide and ammonia, which have not been able to combine in the autoclave. The urea containing solution is collected in the separator 3 and is discharged by means of the valve 4, to be eventually subjected to crystallization in order to obtain pure urea.

The vapours of carbon dioxide and ammonia which have separated from the urea liquid collected in the separator 3 are recondensed in the upper chamber 5. To facilitate the condensation of the carbamate, the liquid make up ammonia or part of it, required for the urea synthesis, is introduced into said chamber by means of the pump 11.

The heat developed during the condensation of carbamate is eliminated by means of the indirect cooler 8. The mixture composed of carbamate, ammonia and water (in the liquid state) is recycled to the autoclave 1 by means of a pump 10 conveniently heated to a temperature higher than the temperature of crystallization of the carbamate. The corresponding quantity of make up carbon dioxide necessary for the urea synthesis is introduced into the autoclave 1 by means of the pump 9. The inert gases contained in the make up ammonia and in the make up carbon dioxide are discharged into the atmosphere by means of valve 7. To recover the carbamate contained in said gases these are washed in the column 6 with a limited quantity of water introduced by means of the pump 12. This water is then fed to the condenser 5 where it mixes with the liquid ammonia and carbamate.

The following is an example illustrating the process of the invention:

*Example*

The urea synthesis autoclave is operated at a pressure of 160 atm. and at a temperature of 170° C.; with reference to the drawing, it is fed from pumps 9 and 11 as well as from pump 10 (recycle containing part of NH₃ make up). The liquid leaving the autoclave 1 has the following percent composition (parts by weight):

| | |
|---|---|
| Urea | 35.5 |
| NH₃ | 30.8 |
| CO₂ | 17.4 |
| H₂O | 16.3 |
| | 100.0 | the water representing that formed with the synthesis reaction plus an additional amount.

Said liquid is discharged by means of the valve 2 at the pressure of 25 atm., into the heat exchanger 13 where it is subjected to rapid pressure distillation at the same pressure limiting the temperature drop by keeping the temperature at 130° C. The time of distillation is very short. In the separator 3 a urea solution is collected having the following composition (parts by weight):

| | |
|---|---|
| Urea | 35.5 |
| NH₃ | 9.8 |
| CO₂ | 7.7 |
| H₂O | 14.3 | and distilling gases are:

| | |
|---|---|
| NH₃ | 21.0 |
| CO₂ | 9.7 |
| H₂O | 2.0 | parts by weight. These gases are condensed at 70° C. in the condenser 5. To recover the NH₃ and CO₂ values contained in the inert gases to be purged, these are washed in the column 6 with 3.9 parts of water; the wash water is then added to the condensate in 5.

The liquid make up ammonia necessary amounts to 30 parts by weight, of which 10 parts are introduced directly into the autoclave as stated, while 20 parts are injected into the condenser 5 to facilitate carbamate condensation. The liquid thus obtained has the following percent composition:

| | |
|---|---|
| NH₃ | 72.5 |
| CO₂ | 17.1 |
| H₂O | 10.4 |
| | 100.0 |

The liquid is kept at a temperature above its temperature of crystallization (at 70° C. with the pressure of 25 atm.) and, therefore, it can be easily recompressed into the autoclave 1 by means of moderately heated valves, pipes and pumps (10 in the drawing).

With the cycle described, to produce 35.5 parts by weight of urea—which in theory require 20.2 parts of ammonia and 26 parts of carbon dioxide—30 parts of NH₃ and 33.7 parts of CO₂ are needed in this practical case. Hence the yield of conversion is 20.2:30=67.5% for ammonia and 26:33.7=77.2% for carbon dioxide.

Thus the recovery of residual gases corresponding to a production of 10 tons of urea requires in this case contemporaneous production of only 11 tons of ammonium sulfate, instead of 35 as would be necessary if operating without partial recycle.

Of course it is possible to further increase the yield of conversion of ammonia into urea, by introducing more water into the stripping column and increasing the operating pressure of the autoclave, etc.

As can be seen, the steps and the combination of steps of the process of the invention offer the following advantages over the conventional processes:

Calories are saved because expansion and subsequent condensation of the nonreacted substances is effected at elevated temperature and pressure although these are smaller than with processes recycling gases only; power and apparatus material are saved because no gases have to be compressed for recycling, but only liquids; formation of solid carbamate is prevented so as to avoid corrosion, stoppages, deposits, clogging of valves, etc., as for erosion, conditions are improved also in feeding back to the autoclave only solutions or liquid mixtures, containing no solids; no high temperatures have to be attained, which would favour corrosion; the apparatus equipment is comparatively simple and requires little space, since for the autoclave, heat exchanger and condenser of limited volumes can be used; no compressors are needed; the non-reacted or incompletely reacted substances may be recycled integrally if so desired; the inert gases are eliminated in a rational manner, practically without losses of reagents; the liquid carbamate diluted in ammonia and water is less corrosive.

It should be noted that although water exerts an unfavourable action upon the yield of conversion of the carbamate into urea in the autoclave, the combination of steps and operating conditions of the invention provides among other advantages also higher overall output than other known processes.

It should also be noted that the invention permits, by effectively recovering the reactants before purging the inert gases, to use carbon dioxide of lower degree of purity and, therefore, of lower cost, than is necessary using the conventional processes.

The process described permits to reduce to about the half the consumption of energy required for the compression of ammonia and of carbon dioxide as compared to the commonly used method of recovering the non-urea by producing ammonium sulfate or nitrate.

I claim:

In the process for producing urea from ammonia and carbon dioxide, which comprises mixing in an enclosed space carbon dioxide with ammonia in excess over the stoichiometric amount and heating the mixture under pressure, the improvement of adding to the mixture an amount of water which is more than 6 and less than 20% of the total mixture, heating to about 170° C. at a pressure of about 160 atm. for a time sufficient to produce urea, subjecting the reacted mixture to a pressure drop of 120–150 atm., heating the mixture rapidly to 130°–140° C., gravity-separating an aqueous urea solution from unreacted ammonia and carbon dioxide vapors, cooling said vapors to 60°–90° C. and condensing them at a pressure of 20–45 atm., dissolving the condensed vapors in aqueous ammonia, scrubbing vapors rising during said condensation with water, adding the scrubbing liquid to said aqueous ammonia solution, recycling at least part of said solution into contact with additional carbon dioxide and ammonia in said enclosed space, and adjusting the ratio between said recycling solution and said additional carbon dioxide and ammonia so as to provide the mixture with said excess of ammonia over the stoichiometric amount and said 6–20% of water.

References Cited in the file of this patent

UNITED STATES PATENTS

| 1,429,483 | Bosch et al. | Sept. 19, 1922 |
| 2,267,133 | Porter | Dec. 23, 1941 |